April 28, 1959 M. GRASER, JR 2,884,522

SYNCHRONOUS DETECTOR

Filed Feb. 21, 1955

INVENTOR:
MICHAEL GRASER JR.

BY Donald H. Timbie
HIS ATTORNEY.

2,884,522

SYNCHRONOUS DETECTOR

Michael Graser, Jr., Syracuse, N.Y., assignor to General Electric Company, a corporation of New York Application February 21, 1955, Serial No. 489,697

2 Claims. (Cl. 250—27)

This invention relates to a synchronous detector wherein two waves are mixed and has for its object the reduction of any deleterous effects caused by undesired amplitude variations present in one of the waves.

Although synchronous detectors that are improved in accordance with the principles of this invention are of general utility, they have proven particularly advantageous when used in a color television receiver constructed so as to respond to the type of color television signals that are defined in the presently accepted standards.

Accordingly, it is an object of this invention to provide an improved synchronous detector for use in such color television receivers.

In accordance with present color television standards, certain color information is transmitted in the form of a chroma signal having an amplitude corresponding to the degree of color saturation and a phase corresponding to hue. The chroma signal is comprised of the sidebands produced when different phases of a color carrier are amplitude modulated with different color signals. The chroma carrier itself is transmitted in bursts during line blanking intervals. At a color television receiver, the hue represented by the chroma signal is detected by mixing it with a continuous reference wave that is derived from the bursts of the color carrier. It has been found that some amplitude variations which may be present in the reference wave reach the output of the mixing means (usually termed a synchronous detector) and produce streaks of an incorrect hue in the color image.

In using synchronous detectors, it is customary to apply a reference wave to one grid of the detector tube and an intelligence signal to another grid. Any amplitude variations in the reference wave appear at the output of the detector and may distort the desired output signal. Furthermore, the beat frequency between any spurious noise and the reference wave will be detected and distort the desired output signal. For example, in a color television receiver, filters may be used for deriving the reference wave from the bursts. During nine lines of the field blanking interval, the bursts are not transmitted so that the bursts are in effect amplitude modulated at a field repetition frequency of 60 cycles a second. This means that the bursts have sidebands spaced by 60 cycles. The bandwidth of the filter is such that these sidebands representing the amplitude variations are permitted to pass through the filter. It is customary to insert a limiter between the output of the filter and the input of the synchronous detector, but it has been found that the limiting usually is not perfect so that some way of cancelling-out the amplitude variations is desirable. Of course, when the burst signals are below the threshold of the limiter, the amplitude variations of the reference wave applied to the detector are more severe.

Spurious noise having a frequency that is passed by the filter is often present at its input. When the signals are weak enough, the noise and the reference wave pass through the limiter and arrive at the input of the synchronous detector in such condition that the addition of the spurious noise and the reference wave produces a voltage that varies in amplitude. Owing to the nonlinearity of the detector, the beat frequencies between the noise signals and the reference wave, which beat frequencies represent the aforesaid amplitude variations, appear at the output of the detector. For the usual crystal filter having a Q of about 8,000, the half power point for the beat frequencies occurs at 220 cycles a second. Because of this narrow passband of the filter, the low frequency variations in amplitude are the only ones that appear at the output of the detector.

The presence of the amplitude variations caused by the lack of bursts during the field blanking interval may cause any video D.C. restorers present to set up on an incorrect level and hence may upset the proper color balance. Amplitude variations at the output of the detector caused by spurious noise may cause horizontal streaks of the incorrect color to appear in the final image.

Briefly, the above objects may be attained in accordance with the principles of this invention by applying the reference wave to the control grid of a multigrid amplifier via a coupling circuit that has a time constant that is long enough with respect to a cycle of the reference wave to prevent an undue amount of phase shift and yet short enough to permit the grid to follow the amplitude variations of the reference wave. The intelligence signal is applied to another grid in such manner that the grid is effectively at ground potential for the frequencies of any undesired amplitude variations that appear in the reference wave. The cathode is permitted to vary in potential in accordance with the low-frequency amplitude variations of the reference wave, but is held at a fixed potential for the frequency of the reference wave itself. The low-frequency variations in the cathode potential produce the same variations in the output of the amplifier as would be produced if these same variations were applied to the signal grid in reverse phase. Their effect on the output voltage can be made to compensate for the low-frequency variations produced in the output by the action of the first grid. It is essential that a screen grid be interposed between the signal grid and the control grid so that the signal grid does not affect the cathode current and merely determine the ratio of plate-to-screen current. However, the limiting action of the first grid aids in keeping the reference carrier at a constant amplitude.

The manner in which the above objective may be attained in accordance with the principles of this invention will be more clearly understood after the following discussion of the drawings in which.

Figure 1:
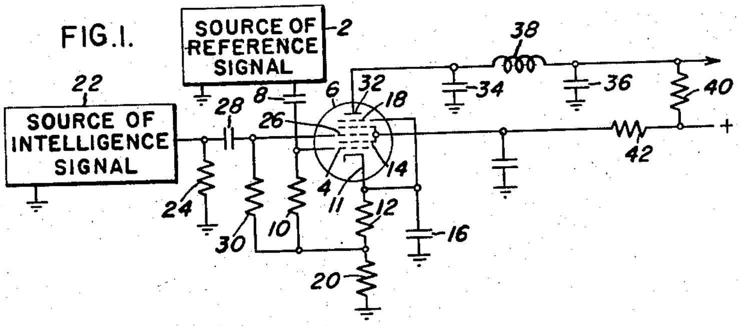
Figure 1 illustrates a single synchronous detector constructed in accordance with the principles of this invention.

Referring now to Figure 1, a source 2 of a reference wave which may have undesired amplitude variations is coupled to a control grid 4 of a pentagrid tube 6 via a coupling capacitor 8 and a grid-leak resistor 10. The time constant $R_{10}C_8$ is short enough to permit the grid to follow low-frequency amplitude variations of the reference wave, but not so short as to introduce more than a few degrees of phase shift in the carrier wave. Ideally, the lower end of the grid-leak resistor 10 should be returned to the cathode 11, but a small resistor 12 may be inserted so as to establish enough bias to prevent damage to a screen grid 14 in the event the reference wave is not present. A capacitor 16 grounds the cathode 11 and a suppressor grid 18 for frequencies of the reference wave and has a high impedance for the low frequencies of the amplitude variations of the reference wave. A resistor 20 that is much larger than resistor 12 is inserted between the lower end of the resistor 12 and ground. Any voltages across the resistor 20 are applied to both the control grid 4 and the cathode 11 so that the resistor 20 does not produce any degeneration.

A source 22 of intelligence signals is terminated in an impedance represented by a resistor 24 and is coupled to a grid 26 via a capacitor 28. A grid-leak resistor 30 is connected between the grid 26 and any suitable source of potential, but in the particular circuit shown it is connected to the junction of the cathode resistors 12 and 20. Hence, the grid 26 is biased by the amount of direct-current potential appearing across the resistor 12. It is important for reasons that will subsequently be explained that the time constant of the capacitor 28 and the resistor 30 be long enough to prevent any low-frequency voltage appearing at the cathode 11 from being applied to the grid 26.

The output signals produced by the mixing in the tube of the intelligence signals and the reference wave appear at a plate 32. Due to the characteristics of the pentagrid tubes, the detected signals appearing at the plate 32 do not appear in the cathode circuit so that no cathode degeneration of these signals occurs and the conversion gain of the detector will not be affected by the resistors 12 and 20. The reference wave and the intelligence signals are prevented from reaching the output of the detector by a low-pass filter comprised of capacitors 34, 36 and an inductor 38. A suitable operating potential is derived for the plate 32 by connecting a resistor 40 between a point of positive potential and the plate 32. A suitable operating potential for the screen grid 14 is derived by connecting a resistor 42 between the screen grid 14 and a point of positive potential.

Figures 2, 3, 4:
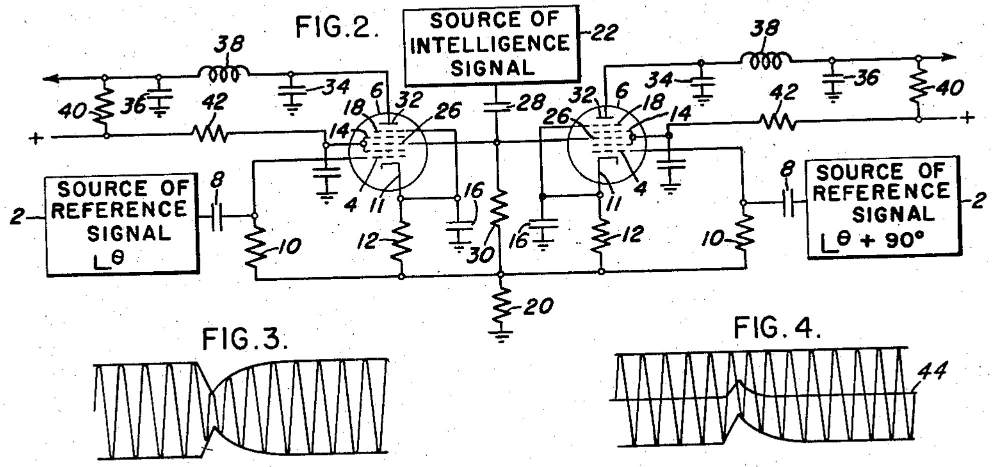
Figure 2 illustrates a dual synchronous detector constructed in accordance with the principles of this invention.
Figures 3 to 8 are graphs useful in explaining the operation of the circuits shown in Figures 1 and 2.
Figure 5:
Figure 6:
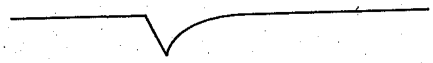
Figure 7:
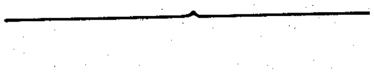
Figure 8:

The operation of the detector of Figure 1 is as follows: Assume, by way of illustration, that poor limiting causes the amplitude of the reference carrier to be reduced as indicated in Figure 3. Owing to conduction of the control grid 4, the positive peaks of the reference wave will be held at the potential of the cathode 11 so that the potential beween the grid 4 and the cathode 11 will appear as indicated in Figure 4. The wave of Figure 4 has a low-frequency component indicated by the line 44 so that the cathode current and voltage follow this wave as indicated in Figure 5. However, the voltage of the cathode 11 does not follow the high-frequency component of the wave (reference wave) of Figure 4 because the cathode is grounded for the frequency by the capacitor 16. The low-frequency signal represented by the line 44 tends to produce a negative voltage at the plate 32 as indicated in Figure 6. However, it will be remembered that the grid 26 is grounded for low-frequencies so that any signal present at the cathode 11 is equivalent to placing an equal and opposite signal at the grid 26. Hence, where a positive signal, such as indicated in Figure 5, appears at the cathode 11, the grid 26 acts so as to tend to increase the voltage at the plate 32 as indicated in Figure 8. The tendency of the grid 4 to reduce the voltage at the plate 32 is, therefore, resisted by the tendency of the grid 26 to increase the voltage at the plate 32 and complete cancellation, such as shown in Figure 7, is possible. The tendency of the grid 26 to change the voltage at the plate depends on the amplitude of the low-frequency signal appearing at the cathode 11 and this in turn is dependent on the combined resistance of the resistors 12 and 20. The resistance of the resistor 12 is kept small in order to cut down the amount of degenerative voltage applied between grid 4 and the cathode. Due to the characteristics of the pentagrid tube, any plate currents produced by the action of grid 26 do not appear in the cathode circuit and, therefore, no degeneration of any kind can be produced by resistor 20 and it can have any value necessary to provide the change in cathode voltage required for cancellation, at the plate 32, of low-frequency signals resulting from amplitude modulation of the reference wave. If the resistor 20 is too large, the grid 26 overcompensates and if it is too small, it does not provide sufficient compensation.

The combined resistance of the resistors 12 and 20 that will produce the desired compensation may be determined as follows: Assume that an amplitude variation of the reference wave produces a change in the current emanating from the cathode 11$I_k$, then the corresponding change in plate current can be represented by $aI_k$, where $a$ is the fraction of the total cathode current flowing to the plate 32. If the combined resistance of the resistors 12 and 20 is $R_k$, then the change in the voltage of the cathode 11 is $I_kR_k$ and if the transconductance of the grid 26 with respect to the plate 32 is $G_{26}$, ($G_{26}$ equals the change in plate current for a given change in the voltage of the grid 26 and is approximately equal to the conversion transconductance G of the tube when used as a converter) then this variation $I_kR_k$ in the voltage of the cathode 11 will cause, through the action of the grid 26, a change in the plate current of $-I_kR_kG_{26}$. For perfect cancellation the sum of $aI_k$ and $-I_kR_kG_{26}$ must equal zero so that $$R_k \text{ equals } \frac{a}{G_{26}} \left(\text{which approximately equals}\right) \frac{a}{G}$$

and the plate current is at some constant value as indicated in Figure 7. If the combined resistance $R_k$ of the resistors 12 and 20 is too small, the voltage $I_kR_k$ and the change in plate current will also be too small so that the low frequency voltage variation of the plate 32 will appear as shown in Figure 6. Conversely, if the resistance $R_k$ is too large, the plate current change will be too much and the plate voltage will rise as shown in Figure 8. The former is a condition of undercompensation and the latter is a condition of overcompensation.

The following table of values of the various components of the circuit of Figure 1 is not to be interpreted as limiting the scope of the invention, but it does give an example of values which have been found to work satisfactorily under conditions where the reference wave has a frequency of 3.58 megacycles and where the chroma signal is approximately centered on this frequency. In this particular example, the tube or valve 6 is a pentagrid tube such as a 6BE6, but it will be apparent to those skilled in the art that other tubes could be used. In fact nearly any three grid tube might be used. Thus, in this example $C_8=33\ \mu\mu$fd.
$C_{28}=0.1\ \mu$fd.
$C_{16}=0.01\ \mu$fd.
$R_{10}=82K\Omega$
$R_{30}=470K\Omega$
$R_{12}=82\Omega$
$R_{20}=600\text{–}800\Omega$ where $\mu\mu$f. represents micromicrofarads, $\mu$fd. microfarads, $K=1000$ and $\Omega$ means ohms. Practical experience with this exemplary circuit has indicated that the value of the resistor 20 can vary by ±25% without producing too much streaking. In order to allow for reduction in the various transconductances, the resistor 20 should probably be toward the upper end of this range.

In many applications, such as in a color television receiver, two synchronous detectors are supplied with different phases of a reference wave provided by a common source. For such an application, a circuit such as illustrated in Figure 2 may be used. Corresponding components of Figures 1 and 2 are indicated by the same numerals. A common resistor 20' can be used inasmuch as the amplitude variations of the differently phased reference waves are identical. Because the currents of both tubes flow through the resistor 14' it should have one-half the resistance of the resistor 14. If the transconductances of the tubes are not the same, the circuit will operate as if the transconductance of both tubes had a value between that of the two tubes. This effect of obtaining an average transconductance of the two tubes helps reduce the effect of any variation in transconductance that the tubes may have.

Although the invention has been discussed in connection with color television receivers, it should be emphasized that it may be used to advantage in any apparatus wherein it is desired to mix two signals and to eliminate the effects of the amplitude variations of one of them, whether such amplitude variations represent intelligence or not. For example, if a first carrier wave having phase and amplitude variations is applied to the grid 4, and a second carrier, which may have amplitude variation, phase variation or both, is applied to the grid 26, the output signal will be affected by the phase variation of the first carrier wave, but it will be independent of the amplitude variation of the first carrier wave.

It will be understood by those skilled in the art that other circuits could be used in place of the capacitor 16. It will be remembered that a carrier and its sidebands are applied to the grid 4. It is only necessary that the impedance of the circuit for the frequencies of the carrier and its sidebands be low with respect to the combined resistance of the resistors 12 and 20 and at the same time have an impedance for the frequencies of the amplitude variations of the carrier that is high with respect to the combined resistance of the resistors 12 and 20. Such a circuit may be termed a bypass circuit for the carrier and its sidebands.

While I have illustrated a particular embodiment of my invention, it will of course be understood that I do not wish to be limited thereto since various modifications both in the circuit arrangement and in the instrumentalities may be made, and I contemplate by the appended claims to cover any such modifications as fall within the true spirit and scope of the invention.

What I claim as new and desire to secure by Letters Patent of the United States is:

1. Apparatus comprising, in combination, a first source of signals that may have desired phase variations and undesired amplitude variations, a second source of signals that may have desired phase and amplitude variations, an electron discharge device having a cathode, a first control grid, a second control grid, a screen grid and an anode, a cathode resistor connected between said cathode and ground, said resistor having a value equal to $a/G$, where $a$ is the fraction of the cathode current reaching said anode under quiescent conditions and G is the conversion transconductance of said electron discharge device when used as a mixer, a first capacitor connected between said cathode and ground, said capacitor having an impedance for said first signal that is low with respect to the resistance of said cathode resistor for the frequency of the signals provided by said first source and high relative to the resistance of said cathode resistor for the frequencies of the undesired amplitude variations of the signal provided by said first source, a second capacitor coupled between said first source and said first control grid, a first grid-leak resistor connected between said first control grid and said cathode, the RC time constant of said second capacitor and said grid-leak resistor being short with respect to the frequency of the undesired amplitude variations on said first signal, a third capacitor connected between said second source and said second control grid, a second grid-leak resistor connected between said second control grid and a point on said cathode resistor of suitable bias potential whereby a portion of cathode to ground potential is applied to said second grid, the RC time constant of said third capacitor and said second grid-leak resistor being long with respect to the frequency of the undesired amplitude variations of said first signal, means for applying operating potentials to said screen grid and said anode, and an output circuit coupled to said anode.

2. Apparatus comprising, in combination, a first source of signals that may have desired phase variations and undesired amplitude variations, a second source of signals that may have desired phase and amplitude variations, an electron discharge device having a cathode, a first control grid, a screen grid, a second control grid and an anode, a cathode resistor connected between said cathode and ground, said resistor having a value equal to $a/G$, where $a$ is the fraction of the cathode current reaching said anode under quiescent conditions and G is the conversion transconductance of said electron discharge device when used as a mixer, a first capacitor connected between said cathode and ground, said capacitor having an impedance for said first signal that is low with respect to the resistance of said cathode resistor for the frequency of the signals provided by said first source and high relative to the resistance of said cathode resistor for the frequencies of the undesired amplitude variations of the signal provided by said first source, a second capacitor coupled between said first source and said first control grid, a first grid-leak resistor connected between said first control grid and a point on said cathode resistor whereby a portion of the cathode to ground potential is applied to said first grid, the RC time constant of said second capacitor and said grid-leak resistor being long enough to pass the desired component of the signals from said first source and short enough with respect to the period of the highest frequency component of the undesired amplitude variations on said first signal, and means for coupling signals from said second source between said second control grid and said cathode.

References Cited in the file of this patent

UNITED STATES PATENTS

| | | |
|---|---|---|
| 2,208,091 | Zakarias | July 16, 1940 |
| 2,233,706 | Kalmus | Mar. 4, 1941 |
| 2,279,058 | Reid | Apr. 7, 1942 |
| 2,322,540 | Travis | Oct. 26, 1943 |
| 2,498,526 | Bucher | Feb. 21, 1950 |
| 2,651,758 | Foster et al. | Sept. 8, 1953 |